US012558919B2

(12) United States Patent
Li

(10) Patent No.: US 12,558,919 B2
(45) Date of Patent: Feb. 24, 2026

(54) WHEEL ASSEMBLY STRUCTURE AND CHILD ACTIVITY CENTER

(71) Applicant: DONGGUAN JINWANG CHILDREN PRODUCTS CO. LTD., Dongguan (CN)

(72) Inventor: Wei Li, Dongguan (CN)

(73) Assignee: DONGGUAN JINWANG CHILDREN PRODUCTS CO. LTD., Dongguan (CN)

( * ) Notice: Subject to any disclaimer, the term of this patent is extended or adjusted under 35 U.S.C. 154(b) by 39 days.

(21) Appl. No.: 18/399,731

(22) Filed: Dec. 29, 2023

(65) Prior Publication Data

US 2024/0123764 A1　Apr. 18, 2024

Related U.S. Application Data

(63) Continuation of application No. PCT/CN2022/101547, filed on Jun. 27, 2022.

(30) Foreign Application Priority Data

Jun. 29, 2021　(CN) .......................... 202121465288.1

(51) Int. Cl.
*B60B 33/06*　(2006.01)
*A47D 3/00*　(2006.01)
*A63H 33/00*　(2006.01)

(52) U.S. Cl.
CPC .............. *B60B 33/06* (2013.01); *A47D 3/001* (2017.05); *A63H 33/00* (2013.01); *B60B 2900/112* (2013.01); *B60B 2900/115* (2013.01)

(58) Field of Classification Search
CPC ....... B60B 33/06; B60B 33/066; B60B 33/04; B60B 33/00; B60B 33/0039;
(Continued)

(56) References Cited

U.S. PATENT DOCUMENTS 1,058,837 A * 4/1913 Zikmund ................ B60B 33/06
16/34
2,524,819 A * 10/1950 McKean ................. B60B 33/06
248/188.2
(Continued)

FOREIGN PATENT DOCUMENTS

CN　203762467 U　8/2014
CN　211969073 U　11/2020
(Continued)

OTHER PUBLICATIONS

International Search Report dated Sep. 8, 2022 in International Application No. PCT/CN2022/101547. English translation attached.
(Continued)

*Primary Examiner* — William L Miller

(57) ABSTRACT

The present disclosure discloses a wheel assembly structure and a child activity center. The wheel assembly structure includes a connection base and a wheel assembly that is deployable. The wheel assembly is pivotally connected to the connection base. The wheel assembly has a deployment state and a storage state. An adjustment mechanism is provided between the connection base and the wheel assembly. The adjustment mechanism is configured to switch the wheel assembly into the storage state from the deployment state. When the wheel assembly is in the deployment state, the wheel assembly is deployed to a first position to move the connection base. When the wheel assembly is in the storage state, the wheel assembly is stored to a second position to stably place the connection base. The wheel assembly structure has a simple overall structure, which facilitates production and lowers production costs.

10 Claims, 8 Drawing Sheets

(58) Field of Classification Search
CPC ........... B60B 33/0049; B60B 2900/112; B60B 2900/115; A47D 3/001; A47D 13/043; A63H 33/00; B62B 7/04; B62B 7/044
USPC ............................................................ 16/19
See application file for complete search history.

(56) References Cited

U.S. PATENT DOCUMENTS

| | | | | |
|---|---|---|---|---|
| 2,698,454 A * | 1/1955 | Meyer | B60B 33/06 | |
| | | | 280/5.2 | |
| 4,008,507 A * | 2/1977 | Smith | B60B 33/06 | |
| | | | 280/43.24 | |
| 4,097,955 A * | 7/1978 | Foge | A45C 5/146 | |
| | | | 280/37 | |
| 4,397,062 A * | 8/1983 | Huang | B60B 33/06 | |
| | | | 16/33 | |
| 4,417,738 A * | 11/1983 | Kendall | B60B 33/06 | |
| | | | 280/43.24 | |
| 4,668,029 A * | 5/1987 | Maizlish | B60B 33/06 | |
| | | | 312/351.13 | |
| 4,773,123 A * | 9/1988 | Yu | A45C 5/146 | |
| | | | 280/37 | |
| 4,815,760 A * | 3/1989 | Dooley | F16M 11/42 | |
| | | | 280/47.131 | |
| 5,203,581 A * | 4/1993 | Jankowski | B60B 33/045 | |
| | | | 280/87.051 | |
| 5,253,389 A * | 10/1993 | Colin | B60B 33/066 | |
| | | | 16/34 | |
| 5,347,682 A * | 9/1994 | Edgerton, Jr. | B60B 33/0039 | |
| | | | 16/34 | |
| 5,533,231 A * | 7/1996 | Bai | B60B 33/0039 | |
| | | | 16/34 | |
| 5,584,546 A * | 12/1996 | Gurin | A47B 21/00 | |
| | | | 312/200 | |
| 6,594,856 B1 * | 7/2003 | Cherukuri | B60B 33/0049 | |
| | | | 16/33 | |
| 8,484,801 B2 * | 7/2013 | Li | B60B 33/0089 | |
| | | | 16/18 CG | |
| 9,302,728 B1 | 4/2016 | Yang | | |
| 9,586,442 B2 * | 3/2017 | Trickle | B60B 33/0005 | |
| 11,089,873 B1 * | 8/2021 | Dawson | B60B 19/12 | |
| 12,043,062 B2 * | 7/2024 | Herman | B60B 33/066 | |
| 12,139,186 B2 * | 11/2024 | Luo | B62B 9/08 | |
| 12,240,270 B2 * | 3/2025 | Scalf | F25D 25/025 | |
| 2002/0166202 A1 * | 11/2002 | Maupin | B60B 33/0039 | |
| | | | 16/19 | |
| 2005/0217071 A1 * | 10/2005 | Shinner | B60B 33/0028 | |
| | | | 16/19 | |
| 2016/0375726 A1 * | 12/2016 | Trickle | B62B 1/12 | |
| | | | 280/43.11 | |
| 2022/0324280 A1 * | 10/2022 | Sheikh Jafari | B60B 33/0063 | |
| 2024/0123763 A1 * | 4/2024 | Li | A63H 33/00 | |
| 2024/0227905 A1 * | 7/2024 | Luo | B62B 9/24 | |
| 2025/0241456 A1 * | 7/2025 | Ruiz | A47D 13/043 | |

FOREIGN PATENT DOCUMENTS

| | | | |
|---|---|---|---|
| CN | 212815509 U | * | 3/2021 |
| CN | 215195407 U | | 12/2021 |
| CN | 215204307 U | | 12/2021 |
| JP | 2010104420 A | | 5/2010 |

OTHER PUBLICATIONS

First Office Action dated Jan. 22, 2025 received in corresponding patent family application No. AU2022305584.

* cited by examiner

21

2

212

214

213

211

5

22

WHEEL ASSEMBLY STRUCTURE AND CHILD ACTIVITY CENTER

CROSS-REFERENCE TO RELATED APPLICATION

This application is a continuation of International Application No. PCT/CN2022/101547, filed on Jun. 27, 2022, which claims priority to Chinese Patent Application No. 202121465288.1 (filed on Jun. 29, 2021), the entire contents of which are incorporated herein by reference.

FIELD

The present disclosure relates to the technical field of children's toys, and particularly, to a wheel assembly structure and a child activity center.

BACKGROUND

Toys are indispensable items in Children's life, which adds pleasure to their playtime.

An existing child activity center station has a wheel structure disposed at its bottom to facilitate a movement of the child activity center station. However, when the child activity center station needs to be stably placed on the ground, it is usually necessary to provide a complex brake structure or remove the wheel structure. In this way, the structure is complex, resulting in an overly inconvenient operation.

In view of this, it is necessary to make improvements in this regard.

SUMMARY

An objective of the present disclosure is to overcome the shortcomings of the prior art and provide a wheel assembly structure and a child activity center that are convenient to operate, simple in structure, and low in cost.

A wheel assembly structure provided in the technical solutions of the present disclosure includes a connection base and a wheel assembly that is deployable. The wheel assembly is pivotally connected to the connection base. The wheel assembly has a deployment state and a storage state. An adjustment mechanism is provided between the connection base and the wheel assembly. The adjustment mechanism is configured to switch the wheel assembly into the storage state from the deployment state. When the wheel assembly is in the deployment state, the wheel assembly is deployed to a first position to move the connection base. When the wheel assembly is in the storage state, the wheel assembly is stored to a second position to stably place the connection base. With this arrangement, an overall structure is simple, which facilitates production and lowers production costs. The wheel assembly can be adjusted to be in the deployment state and the storage state by rotating the wheel assembly, which is convenient in operation.

Further, the adjustment mechanism includes a first engagement portion and a second engagement portion that are disposed on the connection base; and an engagement member disposed on the wheel assembly. The first engagement portion and the second engagement portion are respectively capable of being engaged with the engagement member, to position the wheel assembly at different positions. When the wheel assembly is in the deployment state, the engagement member is engaged with the first engagement portion for positioning. When the wheel assembly is in the storage state, the engagement member is engaged with the second engagement portion for positioning. With this arrangement, the operation is simple and convenient. Moreover, repeated use can be achieved many times.

Further, the first engagement portion is a first engagement groove or a first engagement hole; the second engagement portion is a second engagement groove or a second engagement hole; the engagement member is an elastic engagement block; and during the switching of the wheel assembly into the storage state from the deployment state, the elastic engagement block is compressed and deformed, and the elastic engagement block moves to the second engagement groove or the second engagement hole from the first engagement groove or the first engagement hole. This arrangement results in a simple structure, low production costs, and reduced susceptibility to damage.

Further, the first engagement portion is a first elastic protrusion; the second engagement portion is a second elastic protrusion; the engagement member is a positioning groove or a positioning hole; and during the switching of the wheel assembly into the storage state from the deployment state, the positioning groove or the positioning hole moves to the second elastic protrusion from the first elastic protrusion, and the first elastic protrusion and the second elastic protrusion are compressed and deformed. With this arrangement, it is not easy to be damaged. Moreover, a service life is prolonged.

Further, the wheel assembly includes a base body and a roller. The base body is pivotally connected to the connection base. The roller is rotatably connected to the base body. An engagement member of the adjustment mechanism is connected to the base body. When the wheel assembly is in the deployment state, the roller is positioned at the first position. When the wheel assembly is in the storage state, the roller is positioned at the second position. The wheel assembly has a simple structure and is convenient to produce and manufacture.

Further, the base body is pivotally connected to the connection base through a pivot shaft; and the base body has a first communication hole, a second communication hole rotatably connected to the pivot shaft, and a connection channel slidably connected to the pivot shaft. The first communication hole and the second communication hole are spaced apart from each other, and the connection channel is connected between the first communication hole and the second communication hole. When the wheel assembly is in the deployment state, the pivot shaft is connected in the first communication hole; when the wheel assembly is in the storage state, the pivot shaft is connected in the second communication hole; and during the switching of the wheel assembly into the storage state from the deployment state, the pivot shaft slides to the second communication hole from the first communication hole through the connection channel, and rotates to the second position in the second communication hole. With this arrangement, it is convenient to operate the base body to rotate, such that the base body rotates smoothly.

Further, the base body has a through hole. The through hole is located at a side of the connection channel to enable the connection channel to be deformed. In this way, the connection channel has a deformation capability, such that the pivot shaft passes smoothly.

Further, the connection base has two connection plates spaced apart from each other; and the wheel assembly is connected between the two connection plates. In this way, mounting of the wheel assembly is facilitated.

Further, the connection base has a ball socket opened towards the connection plate; and the two connection plates are at least partially connected in the ball socket. The ball socket is good in structural strength, making the connection plate less susceptible to damage.

A child activity center provided by the technical solutions of the present disclosure includes an activity center member and the wheel assembly structure according to any one of the above technical solutions. The activity center member is connected to the connection base. The wheel assembly is pivotally connected to a bottom of the connection base. The child activity center mounted with the wheel assembly structure is low in manufacturing cost, easier to operate, and thus more attractive.

After the above technical solutions are used, the following beneficial effects are achieved.

The present disclosure provides a wheel assembly structure and a child activity center. The wheel assembly structure includes a connection base and a wheel assembly that is deployable. The wheel assembly is pivotally connected to the connection base. The wheel assembly has a deployment state and a storage state. An adjustment mechanism is provided between the connection base and the wheel assembly. The adjustment mechanism is configured to switch the wheel assembly into the storage state from the deployment state. When the wheel assembly is in the deployment state, the wheel assembly is deployed to a first position to move the connection base. When the wheel assembly is in the storage state, the wheel assembly is stored to a second position to stably place the connection base. The wheel assembly structure has a simple overall structure, which facilitates production and lowers production costs. The wheel assembly can be adjusted to be in the deployment state and the storage state by rotating the wheel assembly, which is convenient in operation. The child activity center installed with the wheel assembly structure is low in cost and more convenient for people to use.

BRIEF DESCRIPTION OF THE DRAWINGS

Referring to the drawings, the content disclosed by the present disclosure will become more understandable. It should be understood that these drawings are merely used for illustrative purposes, rather than limit the scope of the present disclosure, in which.

Figure 1:
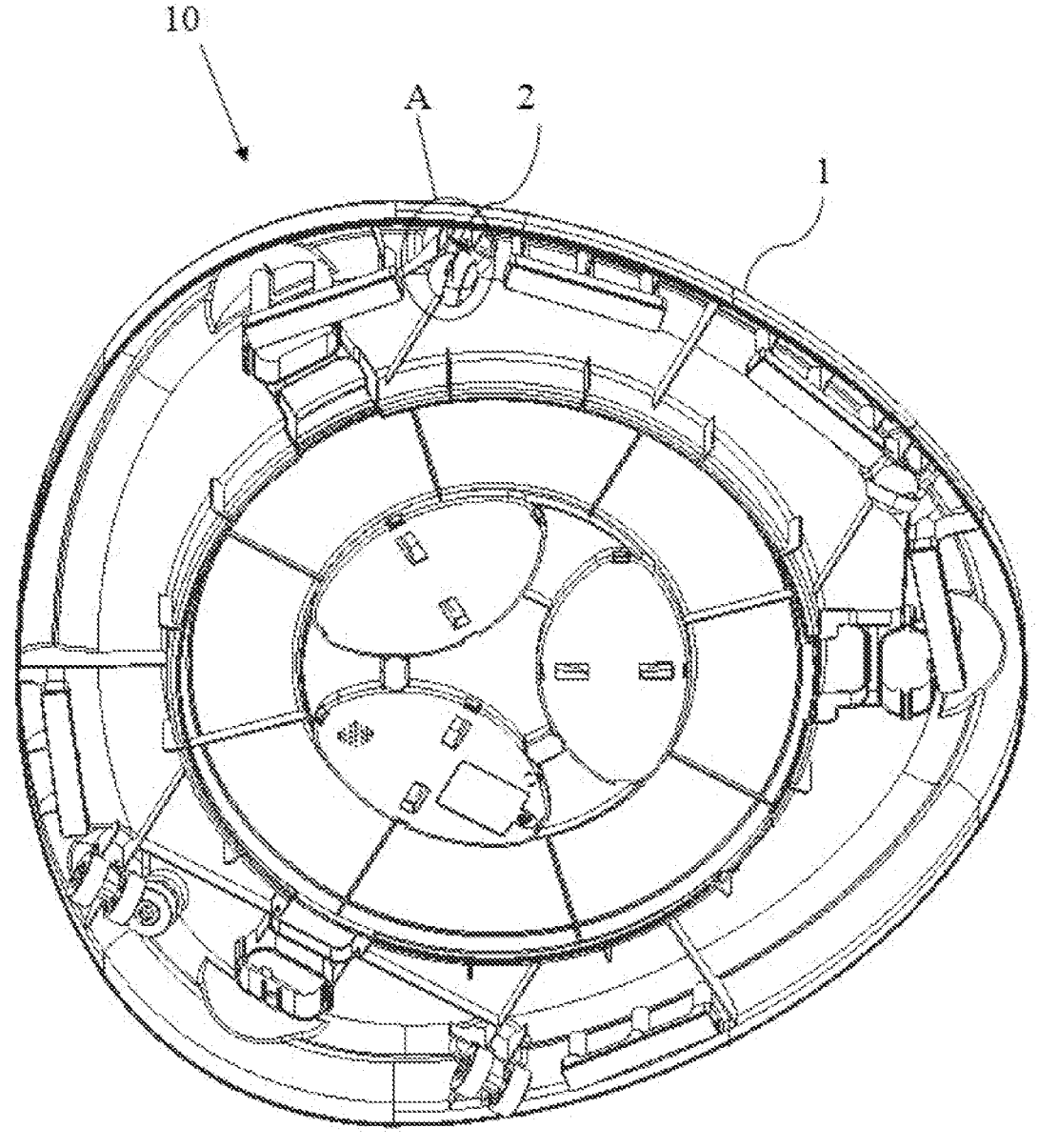
FIG. 1 is a schematic view of a wheel assembly structure according to an embodiment of the present disclosure.

REFERENCE NUMERALS COMPARISON TABLE child activity center 100;
wheel assembly structure 10; activity center member 20;

connection base 1; connection plate 11; ball socket 12; reinforcement rib 13;
wheel assembly 2; base body 21; first communication hole 211; second communication hole 212;
connection channel 213; through hole 214; roller 22; pivot shaft 23;
first engagement portion 3; second engagement portion 4; engagement member 5.

DETAILED DESCRIPTION OF THE EMBODIMENTS

Specific implementations of the present disclosure are further described below with reference to the accompanying drawings.

It is easy to understand that, according to the technical solutions of the present disclosure, those of ordinary skill in the art may replace various structural manners and implementations with each other without departing from the ideas of the present disclosure. Therefore, the following specific implementations and the accompanying drawings are merely exemplary descriptions of the technical solutions of the present disclosure, and should not be regarded as all of the present disclosure, or a restriction or limitation on the technical solutions of the present disclosure.

Orientation terms such as over, below, left, right, front, rear, front, back, top, bottom, etc., which are referred to or may be mentioned in this specification, are defined with respect to the configuration shown in the accompanying drawings, and they are relative concepts and may change in accordance with different locations thereof and different use of states. Therefore, these or other orientation terms should not be explained as limiting terms.

As illustrated in FIG. 1 to FIG. 6, in an embodiment of the present disclosure, a wheel assembly structure 10 includes a connection base 1 and a wheel assembly 2 that is deployable. The wheel assembly 2 is pivotally connected to the connection base 1.

The wheel assembly 2 has a deployment state and a storage state. An adjustment mechanism is provided between the connection base 1 and the wheel assembly 2. The adjustment mechanism is configured to switch the wheel assembly 2 into the storage state from the deployment state.

When the wheel assembly 2 is in the deployment state, the wheel assembly 2 is deployed to a first position to move the connection base 1.

When the wheel assembly 2 is in the storage state, the wheel assembly 2 is stored to a second position to stably place the connection base 1.

Figure 8:
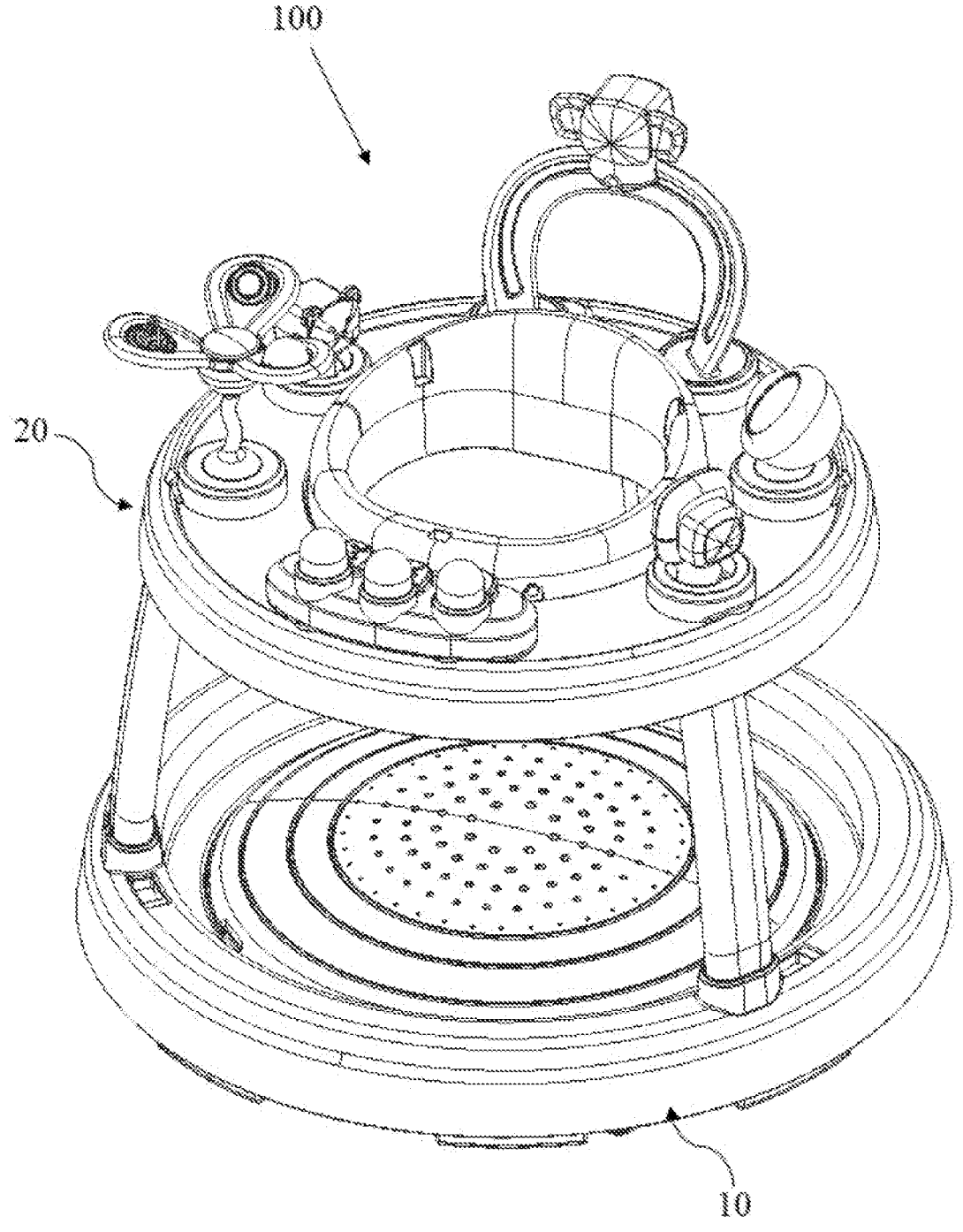
FIG. 8 is a schematic view of a child activity center according to an embodiment of the present disclosure.

As illustrated in FIG. 8, the wheel assembly structure 10 is configured to be mounted on a child activity center 100, which can conveniently move the child activity center 100.

In an exemplary embodiment of the present disclosure, the wheel assembly structure 10 includes a connection base 1, a wheel assembly 2, and an adjustment mechanism. The connection base 1 is connected to a bottom of the child activity center 100. The connection base 1 has a base groove opened downwards. The wheel assembly 2 is pivotally connected in the base groove, i.e., the wheel assembly 2 can rotate in the base groove. The wheel assembly 2 is allowed to have the deployment state and the storage state by rotating the wheel assembly 2. The wheel assembly 2 has a connection portion connected to the connection base 1 and a rotatable rotary wheel portion.

The adjustment mechanism is disposed between the connection base 1 and the wheel assembly 2, and can control the rotation of the wheel assembly 2 and keep the wheel assembly 2 fixed. Through the adjustment mechanism, the wheel assembly 2 can be allowed to be switched back and forth between the deployment state and the storage state.

Figure 4:
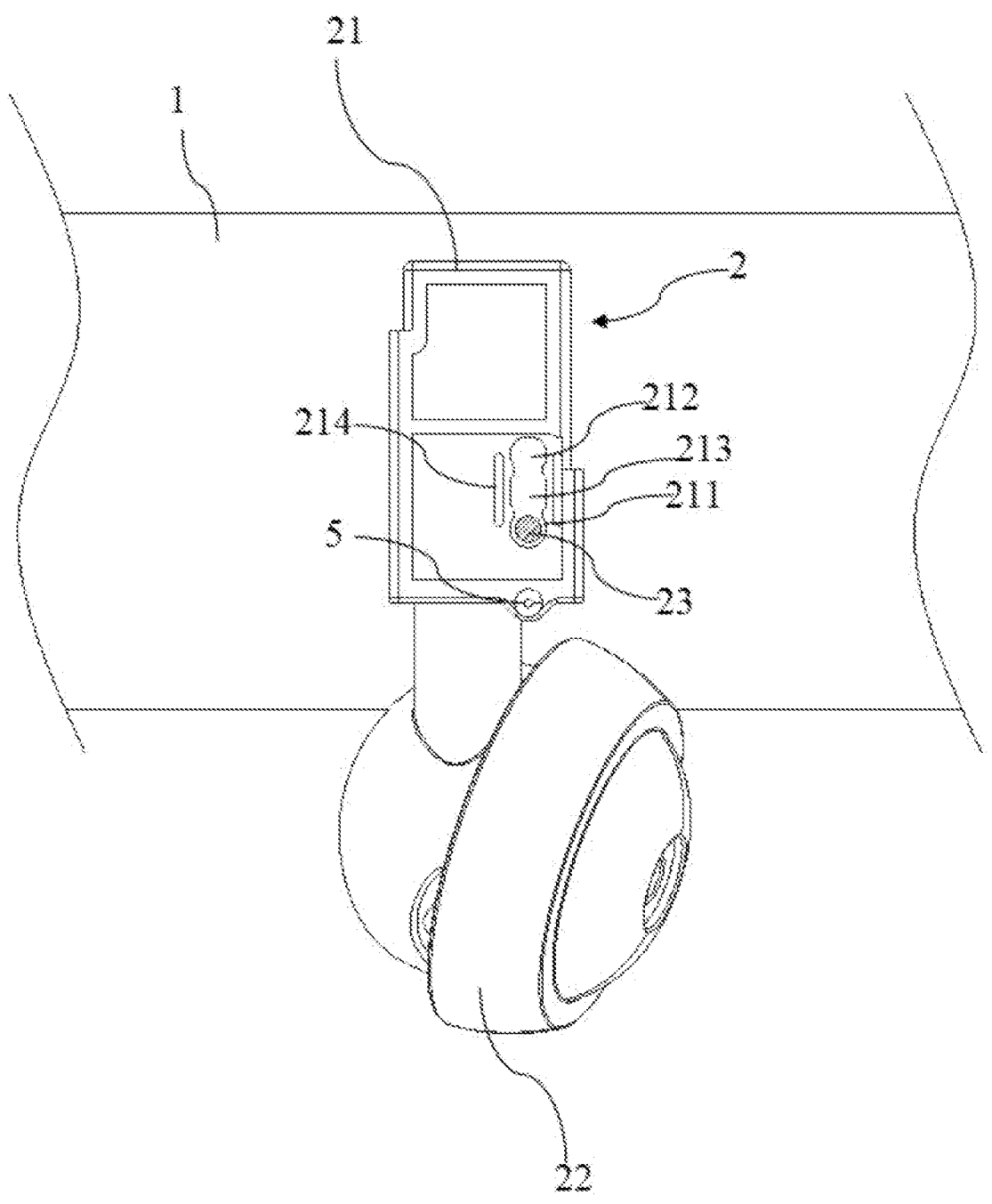
FIG. 4 is a schematic view of a wheel assembly in a deployment state according to an embodiment of the present disclosure.
Figure 5:
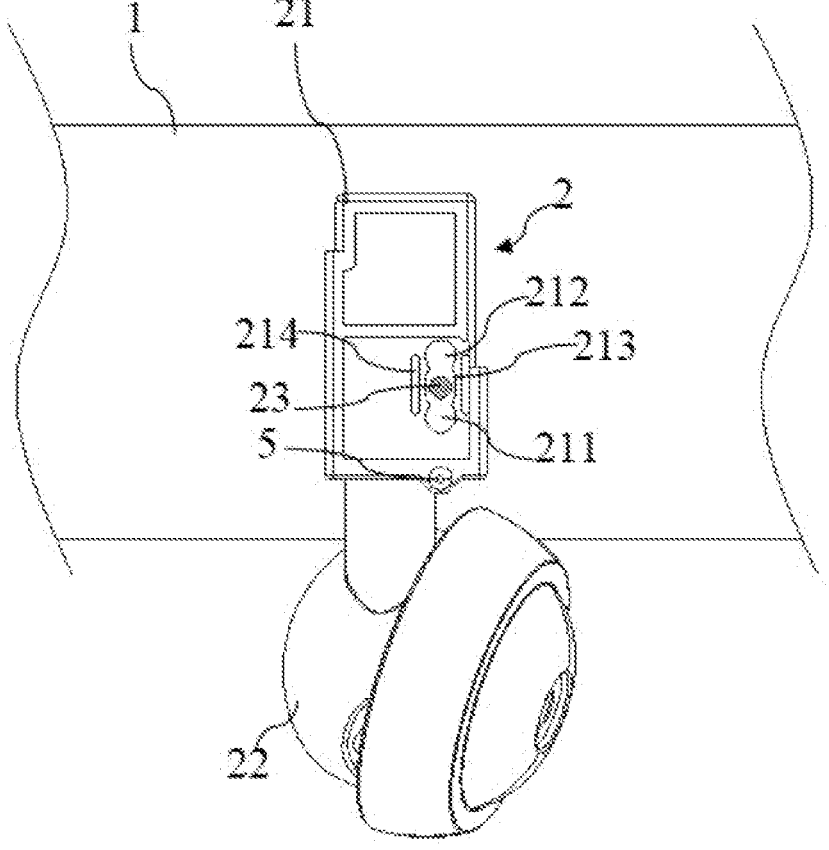
FIG. 5 is a schematic view of a wheel assembly during state switching according to an embodiment of the present disclosure.
Figure 6:
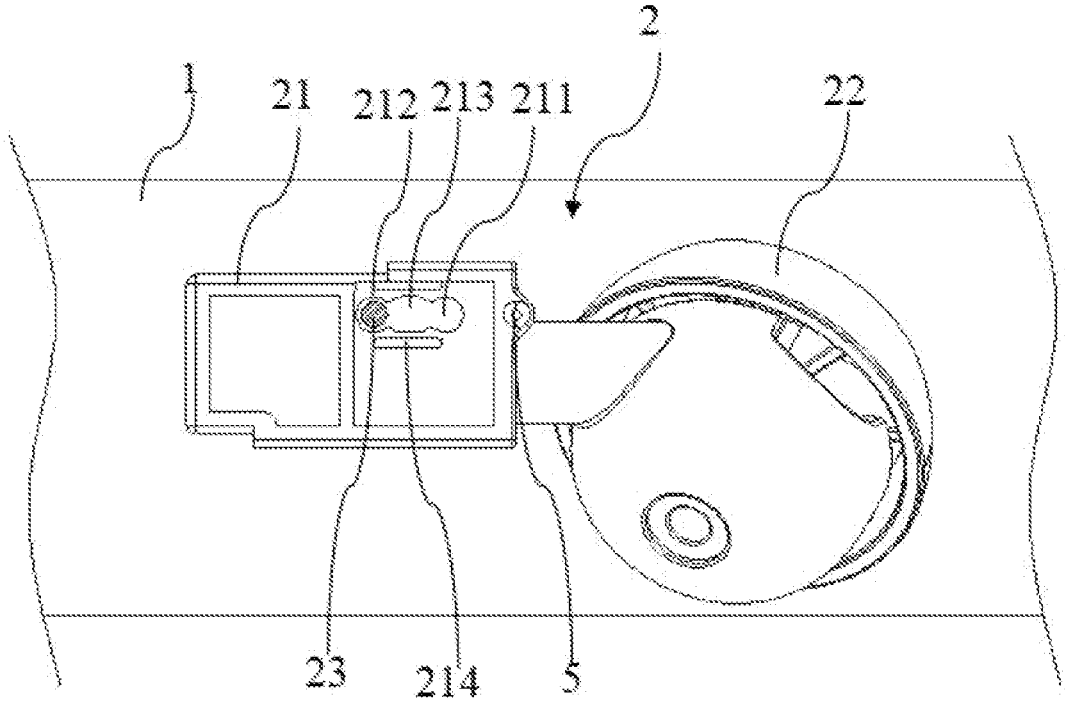
FIG. 6 is a schematic view of a wheel assembly in a storage state according to an embodiment of the present disclosure.

As illustrated in FIG. 4 to FIG. 6, when the adjustment mechanism adjusts the wheel assembly 2 to the deployment state from the storage state, the wheel assembly 2 rotates in a forward direction, and the wheel assembly 2 is deployed to the first position. At the first position, the wheel assembly 2 at least partially extends downwards to an outer side of the connection base 1, and the wheel assembly 2 remains fixed. At this time, the rotary wheel portion of the wheel assembly 2 is in contact with the ground, to support the connection base 1, to facilitate the movement of the child activity center 100.

As illustrated in FIG. 4 to FIG. 6, when the adjustment mechanism adjusts the wheel assembly 2 to the storage state from the deployment state, the wheel assembly 2 rotates in a reverse direction, and the wheel assembly 2 is stored to the second position. At the second position, the wheel assembly 2 is at least partially located at an inner side of the connection base 1, and the wheel assembly 2 remains fixed. At the second position, a wheel portion is located at the inner side of the connection base 1, and the connection portion is in contact with the ground or the connection base 1 is in contact with the ground. In this way, the connection base 1 can be more stably supported, allowing the connection base 1 to be kept stationary on the ground.

It should be noted that the forward direction and the reverse direction are not absolute, but are only used to illustrate that the wheel assembly 2 can rotate in two opposite directions.

With this arrangement, the wheel assembly structure 10 is simple in overall structure, thereby reducing the production cost. When the connection base 1 needs to be moved, the wheel assembly 2 is adjusted to the deployment state. When the connection base 1 needs to be stably placed, the wheel assembly 2 is adjusted to the storage state. The entire steps are simple and convenient to operate.

In an embodiment, as illustrated in FIG. 1 to FIG. 6, the adjustment mechanism includes a first engagement portion 3 and a second engagement portion 4 that are disposed on the connection base 1, and an engagement member 5 disposed on the wheel assembly 2. The first engagement portion 3 and the second engagement portion 4 are respectively capable of being engaged with the engagement member 5, to position the wheel assembly 2 at different positions. When the wheel assembly 2 is in the deployment state, the engagement member 5 is engaged with the first engagement portion 3 for positioning. When the wheel assembly 2 is in the storage state, the engagement member 5 is engaged with the second engagement portion 4 for positioning.

In an exemplary embodiment of the present disclosure, the adjustment mechanism is composed of the first engagement portion 3, the second engagement portion 4, and the engagement member 5. The first engagement portion 3 and the second engagement portion 4 are disposed on the connection base 1. The engagement member 5 is disposed on the wheel assembly 2. The first engagement portion 3 and the second engagement portion 4 can be detachably connected to the engagement member 5, respectively, i.e., the first engagement portion 3 and the engagement member 5 can be connected to each other and disengaged from each other, and the second engagement portion 4 can be connected to and disengaged from the engagement member 5.

The first engagement portion 3 and the second engagement portion 4 are spaced apart from each other. When the wheel assembly 2 is in the deployment state, the engagement member 5 is disengaged from the second engagement portion 4 and engaged with the first engagement portion 3, such that the wheel assembly 2 remains stationary in the deployment state. When the wheel assembly 2 is in the storage state, the engagement member 5 is disengaged from the first engagement portion 3 and engaged with the second engagement portion 4, such that the wheel assembly 2 remains stationary in the storage state. The adjustment mechanism in such an arrangement is convenient to operate and can be repeatedly used many times.

In another exemplary embodiment of the present disclosure, the first engagement portion 3 and the second engagement portion 4 are engagement hooks, and the engagement member 5 is a engagement lug. The engagement lug has predetermined elasticity. When the engagement lug is connected to the engagement hook, the engagement lug is bent and deformed firstly, and then the engagement hook is engaged in the engagement lug. In other embodiments of the present disclosure, the first engagement portion 3, the second engagement portion 4, and the engagement member 5 may also be of other structures, as long as the detachable connection can be implemented.

Figure 2:
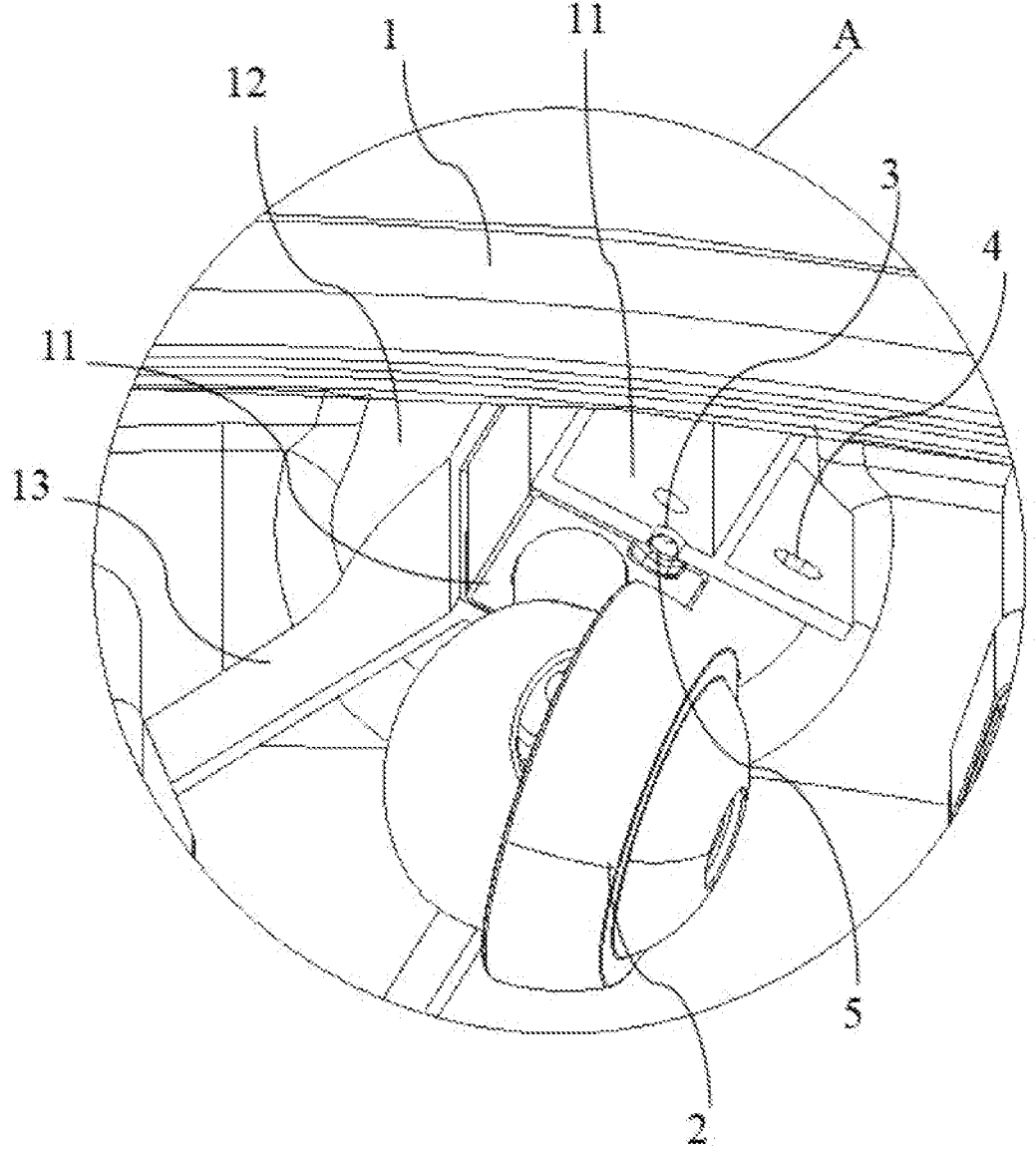
FIG. 2 is an enlarged view of FIG. 1 at A.
Figure 3:
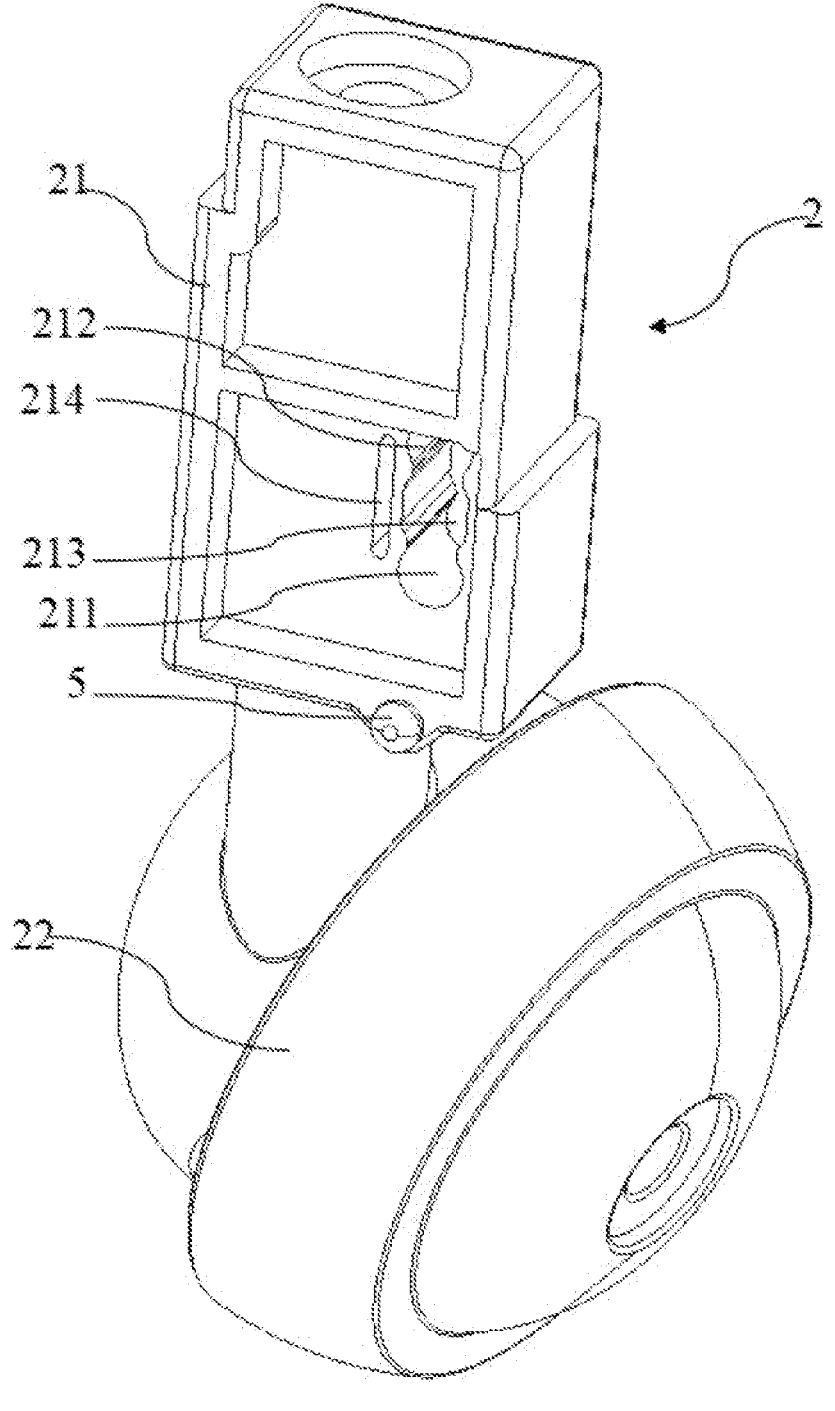
FIG. 3 is a schematic view of a wheel assembly according to an embodiment of the present disclosure.

In an embodiment, as illustrated in FIG. 1 to FIG. 3, the first engagement portion 3 is a first engagement groove or a first engagement hole. The second engagement portion 4 is a second engagement groove or a second engagement hole. The engagement member 5 is an elastic engagement block. During the switching of the wheel assembly 2 into the storage state from the deployment state, the elastic engagement block is compressed and deformed, and the elastic engagement block moves to the second engagement groove or the second engagement hole from the first engagement groove or the first engagement hole.

In an exemplary embodiment of the present disclosure, the first engagement portion 3 and the second engagement portion 4 are engagement grooves or engagement holes defined on the connection base 1. As an example, the first engagement portion 3 and the second engagement portion 4 are used as engagement grooves for description. The first engagement portion 3 is defined as a first engagement groove, and the second engagement portion 4 is defined as a second engagement groove. The engagement member 5 is a deformable elastic engagement block having an extension state and a retraction state. When the elastic engagement block is in the extension state, the elastic engagement block is engaged in the first engagement groove or the second engagement groove. When the elastic engagement block is in the retraction state, the elastic engagement block is disengaged from the first engagement groove or the second engagement groove.

As an example, the wheel assembly 2 is switched to the storage state from the deployment state. When the wheel assembly 2 is in the deployment state, the elastic engagement block is in the extension state and is engaged in the first engagement groove. When switching is needed, the elastic engagement block is compressed firstly to be in the retraction state from the extension state. Moreover, the elastic engagement block is disengaged from the first engagement groove. Then, the wheel assembly 2 rotates towards the second engagement groove. During the rotation of the wheel assembly 2, the elastic engagement block is compressed by a wall surface of the connection base 1 to be in the retraction state all the time. When the wheel assembly 2 rotates to enable the elastic engagement block to be aligned with the second engagement groove, the elastic engagement block changes to the extension state from the retraction state under the action of the elasticity of the elastic engagement block itself, and is engaged in the second engagement groove.

With this arrangement, the first engagement portion 3, the second engagement portion 4, and the engagement member 5 are simple in structure, convenient to produce and manufacture, and not easy to damage.

In another exemplary embodiment of the present disclosure, the elastic engagement block is a rubber block.

In another exemplary embodiment of the present disclosure, the elastic engagement block is an elastic plate. An end of the elastic plate is connected to the wheel assembly 2, and another end of the elastic plate is an engagement end.

In an embodiment, the first engagement portion 3 is a first elastic protrusion. The second engagement portion 4 is a second elastic protrusion. The engagement member 5 is a positioning groove or a positioning hole. During the switching of the wheel assembly 2 into the storage state from the deployment state, the positioning groove or the positioning hole moves to the second elastic protrusion from the first elastic protrusion, and the first elastic protrusion and the second elastic protrusion are compressed and deformed.

In an exemplary embodiment of the present disclosure, the first engagement portion 3 and the second engagement portion 4 are deformable elastic protrusions. The first engagement portion 3 is defined as the first elastic protrusion. The second engagement portion 4 is defined as the second elastic protrusion. The engagement member 5 is the positioning groove or the positioning hole. As an example, the engagement member 5 is the positioning groove for description. The elastic protrusion has a first state and a second state. When the elastic protrusion is in the first state, the elastic protrusion is engaged in the positioning groove. When the elastic protrusion is in the second state, the elastic protrusion is disengaged from the positioning groove.

When the wheel assembly 2 is in the deployment state, the first elastic protrusion is in the first state and is engaged in the positioning groove, and the second elastic protrusion is in the second state. When the wheel assembly 2 is switched into the storage state from the deployment state, the first elastic protrusion is first compressed. In this way, the first elastic protrusion is compressed to be in the second state and is disengaged from the positioning groove. Then, the wheel assembly 2 is rotated. When the wheel assembly 2 rotates to enable the positioning groove to be aligned with the second elastic protrusion, the second elastic protrusion changes to the first state from the second state under the action of the elasticity of the second elastic protrusion itself, and is engaged in the positioning groove.

With this arrangement, the wheel assembly 2 is allowed to be not easily damaged. Moreover, when the wheel assembly 2 is switched into the storage state from the deployment state, the number of compression on the first elastic protrusion and the second elastic protrusion is also reduced, thereby prolonging a service life.

In another exemplary embodiment of the present disclosure, the first elastic protrusion and the second elastic protrusion are rubber protrusions. In other embodiments of the present disclosure, other structures may be provided, as long as the structure has elasticity and can be extended and retracted.

In an embodiment, as illustrated in FIG. 1 to FIG. 6, the wheel assembly 2 includes a base body 21 and a roller 22. The base body 21 is pivotally connected to the connection base 1. The roller 22 is rotatably connected to the base body 21. An engagement member 5 of the adjustment mechanism is connected to the base body 21. When the wheel assembly 2 is in the deployment state, the roller 22 is positioned at the first position. When the wheel assembly 2 is in the storage state, the roller 22 is positioned at the second position.

In an exemplary embodiment of the present disclosure, the wheel assembly 2 is composed of a base body 21 and a roller 22. The base body 21 is a connection portion of the wheel assembly 2, and the roller 22 is a rotary wheel portion of the wheel assembly 2. The base body 21 is rotatably connected to the connection base 1. Moreover, the engagement member 5 is connected to the base body 21. In this way, the engagement member 5 can rotate along with the base body 21. The roller 22 is connected to the base body 21 through a connection shaft, and the roller 22 can autorotate around the connection shaft.

When the base body 21 rotates to the deployment state, the roller 22 is located at a lower side of the connection base 1 and is in contact with the ground. In this way, the connection base 1 can be pushed to move conveniently.

When the base body 21 rotates to the storage state, the roller 22 is at least partially located at an inner side of the connection base 1. For example, the roller 22 is located at the inner side of the connection base 1 in whole, i.e., located above a bottom surface of the connection base 1. At this time, the connection base 1 or the base body 21 is in contact with the ground, such that the connection base 1 is not easily moved. In this way, the connection base 1 is stably placed on the ground. Alternatively, the roller 22 is partially located at the inner side of the connection base 1. At this time, the base body 21 is in contact with the ground, and the roller 22 is suspended above the ground.

In an embodiment, as illustrated in FIG. 3 to FIG. 6, the base body 21 is pivotally connected to the connection base 1 through a pivot shaft 23. The base body 21 has a first communication hole 211, a second communication hole 212 rotatably connected to the pivot shaft 23, and a connection channel 213 slidably connected to the pivot shaft 23. The first communication hole 211 and the second communication hole 212 are spaced apart from each other. The connection channel 213 is connected between the first communication hole 211 and the second communication hole 212. When the wheel assembly 2 is in the deployment state, the pivot shaft 23 is connected in the first communication hole 211. When the wheel assembly 2 is in the storage state, the pivot shaft 23 is connected in the second communication hole 211. During the switching of the wheel assembly 2 into the storage state from the deployment state, the pivot shaft 23 slides to the second communication hole 212 from the first communication hole 211 through the connection channel 213, and rotates to the second position in the second communication hole 212.

In an exemplary embodiment of the present disclosure, the base body 21 has the first communication hole 211 and the second communication hole 212 that are spaced apart from each other. The first communication hole 211 is located below the second communication hole 212. The connection channel 213 is connected between the first communication hole 211 and the second communication hole 212. One end of the connection channel 213 is in communication with the first communication hole 211, and another end of the connection channel 213 is in communication with the second communication hole 212. The pivot shaft 23 can rotate in the second communication hole 212 and can slide in the connection channel 213.

When the wheel assembly 2 is in the deployment state, the pivot shaft 23 is located in the first communication hole 211. When the wheel assembly 2 is switched into the storage state from the deployment state, the base body 21 is pulled to move downwards, allowing the pivot shaft 23 to slide into the second communication hole 212 through the connection channel 213. Then, the base body 21 rotates, and the pivot shaft 23 rotates in the second communication hole 212. After the rotation, the wheel assembly 2 is in the storage state. With this arrangement, a space for rotation of the base body 21 is increased. In addition, enough rotation space is provided for rotation of the base body 21. Moreover, the operation is convenient.

In another exemplary embodiment of the present disclosure, a side of the base body 21 has a stop plate. When the pivot shaft 23 is located in the first communication hole 211, the stop plate is in contact with the base body 21 to block the base body 21 from swinging. When the pivot shaft 23 slides to the second communication hole 212, the base body 21 is located below the stop plate. Moreover, the base body 21 and the stop plate are spaced apart from each other by a predetermined distance, such that the base body 21 can rotate.

In an embodiment, as illustrated in FIG. 3 to FIG. 6, the base body 21 has a through hole 214. The through hole 214 is located at a side of the connection channel 213 to enable the connection channel 213 to be deformed.

In an exemplary embodiment of the present disclosure, the through hole 214 is a elongated hole, is located at a side of the connection channel 213, and is parallel to the connection channel 213. A channel wall is formed between the through hole 214 and the connection channel 213. Through the arrangement of the through hole 214, a deformation space is reserved for the channel wall, such that the channel wall has a predetermined elasticity. When the channel wall is compressed by the pivot shaft 23, the channel wall can partially move into the through hole 214.

In another exemplary embodiment of the present disclosure, the connection channel 213 includes a first channel opening connected to the first communication hole 211 and a second channel opening connected to the second communication hole 212. A width of the first channel opening is smaller than a diameter of the first communication hole 211, and a width of the second channel opening is smaller than a diameter of the second communication hole 212. In this way, the pivot shaft 23 can be engaged into the first communication hole 211 and the second communication hole 212. When the pivot shaft 23 moves through the first channel opening or the second channel opening, the pivot shaft 23 compresses the first channel opening or the second channel opening to deform the first channel opening or the second channel opening, and the through hole 214 provides the deformation space.

In another exemplary embodiment of the present disclosure, two sides of the connection channel 213 have a through hole 214, respectively.

In an embodiment, as illustrated in FIG. 1 and FIG. 4 to FIG. 7, the connection base 1 has two connection plates 11 spaced apart from each other. The wheel assembly 2 is connected between the two connection plates 11. An accommodation groove is defined between the two connection plates 11. The base body 21 is connected between the two connection plates 11 through the pivot shaft 23, and is at least partially located in the accommodation groove. With this arrangement, it is convenient to install the wheel assembly 2.

In another exemplary embodiment of the present disclosure, the first engagement portion 3 and the second engagement portion 4 are disposed on the connection plate 11 facing towards the engagement member 5.

Figure 7:
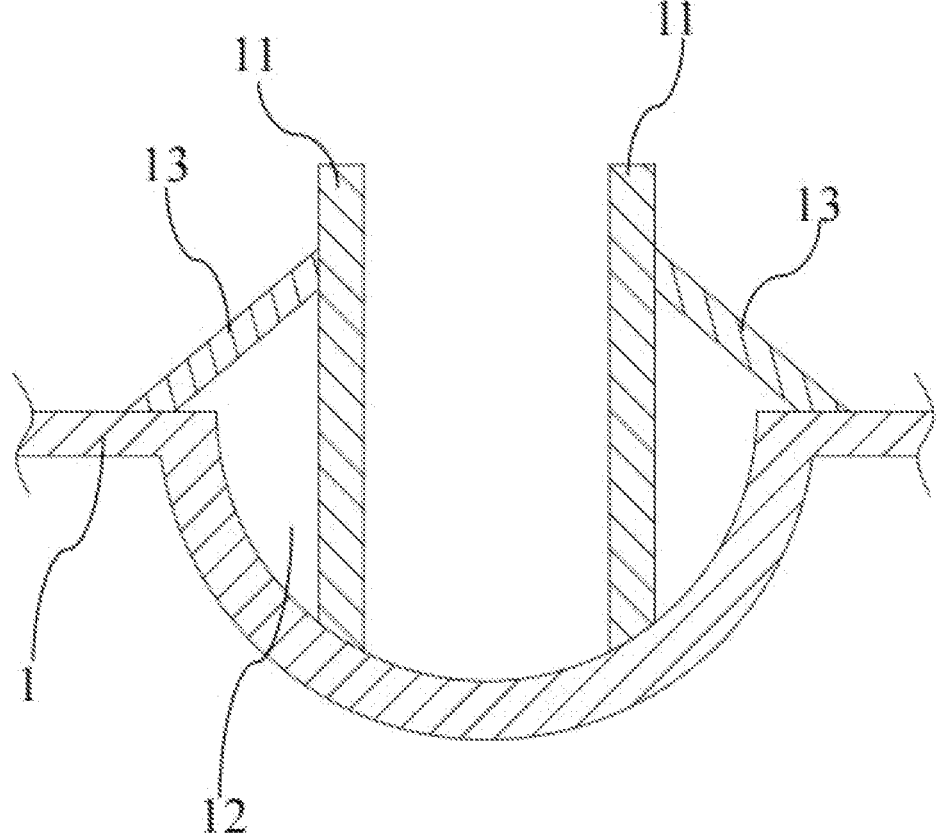
FIG. 7 is a schematic view of a connection plate, a ball socket, and a reinforcement rib according to an embodiment of the present disclosure.

In an embodiment, as illustrated in FIG. 1 and FIG. 7, the connection base 1 has a ball socket 12 opened towards the connection plate 11. The two connection plates 11 are at least partially connected in the ball socket 12.

In an exemplary embodiment of the present disclosure, the wall surface of the connection base 1 is recessed to form the ball socket 12, which is opened towards the wheel assembly 2. An upper end of each of the two connection plates 11 is connected in the ball socket 12. The ball socket 12 determines the mounting position for the connection plate 11. In this way, the connection plate 11 can be accurately mounted. Moreover, the ball socket 12 has good mechanical properties and has a wall surface that can better disperse the stress, thereby better protecting the connection plate 11.

In an embodiment, as illustrated in FIG. 1 and FIG. 7, the connection base 1 has a reinforcement rib 13. The reinforcement rib 13 is connected to a side of the connection plate 11. An end of the reinforcement rib 13 is connected to the connection plate 11, and another end of the reinforcement rib 13 is connected to the connection base 1. In this way, a connection between the connection plate 11 and the connection base 1 is enhanced. Therefore, the structural strength of the connection plate 11 is improved, making the connection plate 11 less susceptible to damage.

As illustrated in FIG. 1 to FIG. 8, a child activity center 100 according to the present disclosure includes an activity center member 20 and the wheel assembly structure 10 described above.

The activity center member 20 is connected to the connection base 1. The wheel assembly 2 is pivotally connected to a bottom of the connection base 1.

A specific structure and function of the wheel assembly structure 10 refer to the foregoing related contents, and details are omitted herein.

The child activity center 100 is composed of an activity center member 20 and a wheel assembly structure 10. The activity center member 20 is used for placing children and for children to play.

In another exemplary embodiment of the present disclosure, the activity center member 20 has a seat pocket for placing a child. Moreover, various toys such as a toy horn, a toy bell, or a toy music box are installed on the activity center member 20.

The activity center member 20 is connected to the connection base 1 and is located above the connection base 1. The wheel assembly 2 is pivotally connected to the bottom of the connection base 1.

When the wheel assembly 2 is in the deployment state, the roller 22 of the wheel assembly 2 is in contact with the ground, allowing for an effortless movement of the child activity center 100.

When the wheel assembly 2 is in the storage state, the base body of the wheel assembly 2 or the connection base 1 is in contact with the ground, thereby increasing a friction force of the base body or the connection base 1 with the ground. In this way, the child activity center 100 can be stably placed on the ground.

With this arrangement, the child activity center 100 can switch its use state through the wheel assembly structure 10, which is convenient for people to use. Moreover, a complex brake structure is removed and the production cost is lowered. Therefore, the attraction of the child activity center 100 is improved.

In summary, the present disclosure discloses a wheel assembly structure 10, which includes the connection base 1 and the wheel assembly 2 that is deployable. The wheel assembly 2 is pivotally connected to the connection base 1. The wheel assembly 2 has the deployment state and the storage state. The adjustment mechanism is provided between the connection base 1 and the wheel assembly 2. The adjustment mechanism is configured to switch the wheel assembly 2 into the storage state from the deployment state. When the wheel assembly 2 is in the deployment state, the wheel assembly 2 is deployed to the first position to move the connection base 1. When the wheel assembly 2 is in the storage state, the wheel assembly 2 is stored to the second position to stably place the connection base 1. The wheel assembly structure 10 can be adjusted. When the wheel assembly 2 is adjusted to the deployment state, the wheel assembly 2 is in contact with the ground. In this way, the connection base 1 is conveniently pushed. When the wheel assembly 2 is adjusted to the storage state, the connection base 1 or the wheel assembly 2 is at least partially in contact with the ground, such that the connection base 1 is stably placed on the ground. The whole wheel assembly structure 10 is simple and is not easy to be damaged. Adjustment can be performed by rotating the wheel assembly 2, which is convenient to operate.

The present disclosure further discloses a child activity center 100, which includes an activity center member 20 and a wheel assembly structure 10. The activity center member 20 is connected to the connection base 1, and the wheel assembly 20 is pivotally connected to the bottom of the connection base 1. The arrangement of the wheel assembly structure 10 not only improves use convenience of the child activity center 100, but also lowers the manufacturing cost, thereby improving market competitiveness of the child activity center structure 100.

The above is merely a principle and a preferred embodiment of the present disclosure. It should be noted that, for a person of ordinary skill in the art, on the basis of the principle of the present disclosure, several other variations can also be made, and should also be regarded as the scope of the present disclosure.

What is claimed is:

1. A wheel assembly structure, comprising:
a connection base; and
a wheel assembly that is deployable, the wheel assembly being pivotally connected to the connection base,
wherein the wheel assembly has a deployment state and a storage state, wherein an adjustment mechanism is provided between the connection base and the wheel assembly, the adjustment mechanism being configured to switch the wheel assembly into the storage state from the deployment state;
wherein when the wheel assembly is in the deployment state, the wheel assembly is deployed to a first position to move the connection base;
wherein when the wheel assembly is in the storage state, the wheel assembly is stored to a second position to stably place the connection base;
wherein the adjustment mechanism comprises:
a first engagement portion and a second engagement portion that are disposed on the connection base; and
an engagement member disposed on the wheel assembly,
wherein the first engagement portion and the second engagement portion are respectively capable of being engaged with the engagement member, to position the wheel assembly at different positions;
wherein when the wheel assembly is in the deployment state, the engagement member is engaged with the first engagement portion for positioning; and
wherein when the wheel assembly is in the storage state, the engagement member is engaged with the second engagement portion for positioning;

wherein the connection base has two connection plates spaced apart from each other, the wheel assembly being connected between the two connection plates; and
wherein the connection base has a ball socket opened towards the connection plate, the two connection plates being at least partially connected in the ball socket.

2. The wheel assembly structure according to claim 1, wherein:
the first engagement portion is a first engagement groove or a first engagement hole;
the second engagement portion is a second engagement groove or a second engagement hole;
the engagement member is an elastic engagement block; and
during the switching of the wheel assembly into the storage state from the deployment state, the elastic engagement block is compressed and deformed, and the elastic engagement block moves to the second engagement groove or the second engagement hole from the first engagement groove or the first engagement hole.

3. The wheel assembly structure according to claim 1, wherein the wheel assembly comprises:
a base body pivotally connected to the connection base; and
a roller rotatably connected to the base body,
wherein the engagement member of the adjustment mechanism is connected to the base body;
wherein when the wheel assembly is in the deployment state, the roller is positioned at the first position; and
wherein when the wheel assembly is in the storage state, the roller is positioned at the second position.

4. The wheel assembly structure according to claim 3, wherein:
the base body is pivotally connected to the connection base through a pivot shaft; and
the base body has a first communication hole, a second communication hole rotatably connected to the pivot shaft, and a connection channel slidably connected to the pivot shaft, the first communication hole and the second communication hole being spaced apart from each other, and the connection channel being connected between the first communication hole and the second communication hole;
when the wheel assembly is in the deployment state, the pivot shaft is connected in the first communication hole;
when the wheel assembly is in the storage state, the pivot shaft is connected in the second communication hole; and
during the switching of the wheel assembly into the storage state from the deployment state, the pivot shaft slides to the second communication hole from the first communication hole through the connection channel, and rotates to the second position in the second communication hole.

5. The wheel assembly structure according to claim 4, wherein the base body has a through hole, the through hole being located at a side of the connection channel to enable the connection channel to be deformed.

6. A child activity center comprising the wheel assembly structure according to claim 1, the child activity center comprising:
an activity center member;
wherein the activity center member is connected to the connection base; and wherein the wheel assembly is pivotally connected to a bottom of the connection base.

7. The child activity center according to claim 6, wherein:

the first engagement portion is a first engagement groove or a first engagement hole;

the second engagement portion is a second engagement groove or a second engagement hole;

the engagement member is an elastic engagement block; and during the switching of the wheel assembly into the storage state from the deployment state, the elastic engagement block is compressed and deformed, and the elastic engagement block moves to the second engagement groove or the second engagement hole from the first engagement groove or the first engagement hole.

8. The child activity center according to claim 6, wherein the wheel assembly comprises:

a base body pivotally connected to the connection base; and a roller rotatably connected to the base body, wherein the engagement member of the adjustment mechanism is connected to the base body;

wherein when the wheel assembly is in the deployment state, the roller is positioned at the first position; and wherein when the wheel assembly is in the storage state, the roller is positioned at the second position.

9. The child activity center according to claim 8, wherein:

the base body is pivotally connected to the connection base through a pivot shaft; and the base body has a first communication hole, a second communication hole rotatably connected to the pivot shaft, and a connection channel slidably connected to the pivot shaft, the first communication hole and the second communication hole being spaced apart from each other, and the connection channel being connected between the first communication hole and the second communication hole;

when the wheel assembly is in the deployment state, the pivot shaft is connected in the first communication hole;

when the wheel assembly is in the storage state, the pivot shaft is connected in the second communication hole; and during the switching of the wheel assembly into the storage state from the deployment state, the pivot shaft slides to the second communication hole from the first communication hole through the connection channel, and rotates to the second position in the second communication hole.

10. The child activity center according to claim 9, wherein the base body has a through hole, the through hole being located at a side of the connection channel to enable the connection channel to be deformed.

\* \* \* \* \*